May 1, 1934. C. J. HANSEN 1,957,265
PROCESS FOR THE PRODUCTION OF AMMONIUM SULPHATE
Filed June 30, 1931
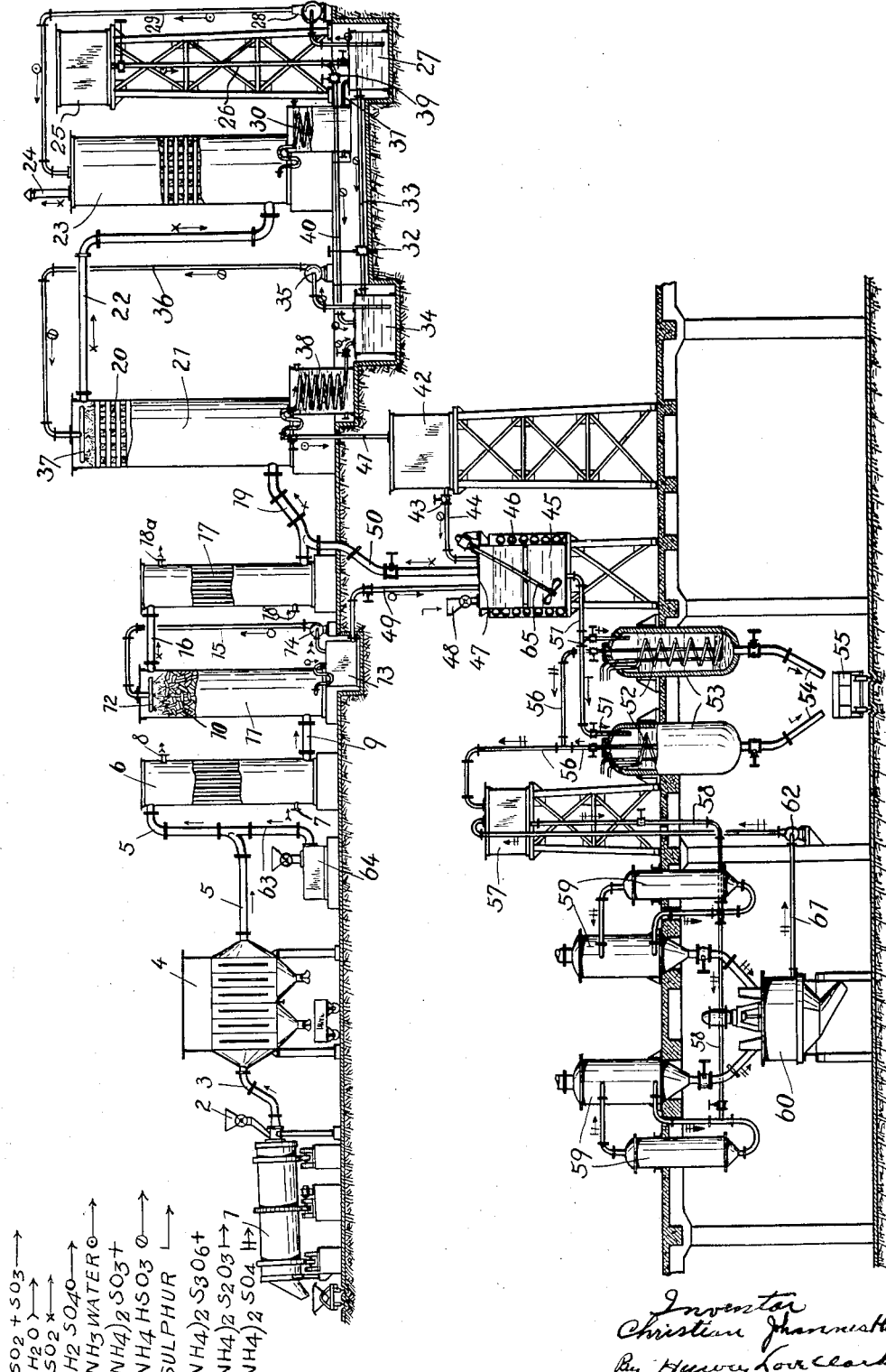

Patented May 1, 1934                                        1,957,265

UNITED STATES PATENT OFFICE

1,957,265

PROCESS FOR THE PRODUCTION OF AMMONIUM SULPHATE

Christian Johannes Hansen, Essen, Germany, assignor, by mesne assignments, to The Koppers Company of Delaware, Pittsburgh, Pa., a corporation of Delaware Application June 30, 1931, Serial No. 547,976
In Germany July 3, 1930

3 Claims. (Cl. 23—119)

The invention relates to a process for the production of ammonium sulphate from aqueous ammonia solution and gaseous sulphur dioxide or from gases containing sulphur dioxide for instance the gases from burners, in which first of all a solution of ammonia sulphite and ammonium bisulphite is produced from sulphur dioxide and the ammoniacal liquor, whereupon the ammonium bisulphite and ammonium sulphite are converted partly or entirely into ammonium thiosulphate and ammonium polythionate in such a manner that a solution of ammonium polythionate, ammonium thiosulphate and possibly amonium bisulphite and ammonium sulphite results, which upon being heated under pressure is converted into a solution containing ammonium sulphate and sulphur from which after separating out the sulphur, solid ammonium sulphate is recovered.

The object of the invention is improvements of the aforesaid process in respect of the conversion of ammonium bisulphite into ammonium polythionate and ammonium thiosulphate. The process according to the invention consists therein that from the sulphur dioxide and ammoniacal liquor first of all a solution of ammonium sulphite and ammonium bisulphite is produced and that this solution is treated with such a quantity of sulphur, possibly under heat so that a solution results which contains ammonium thiosulphate and ammonium polythionate in such a proportion that on being heated under pressure ammonium sulphate and sulphur are produced. According to the invention there is furthermore employed a solution for the purpose of converting into ammonium polythionate and ammonium thiosulphate which contains ammonium sulphite and ammonium bisulphite in the proportion of 1 molecule sulphite and 2 molecules of bisulphite. Finally according to the invention the solution of ammonium sulphite and ammonium bisulphite to be converted by the action of sulphur into a thiosulphate-polythionate solution is heated up with sulphur to temperatures above 60° under normal pressure, whereby the sulphur dioxide possibly being freed in gas form is mixed with the sulphur dioxide which serves for the production of the ammonium sulphite-bisulphite mixture.

The following equations giving the reaction indicate clearly the decompositions effected by the process according to this invention:

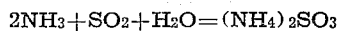
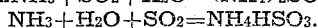
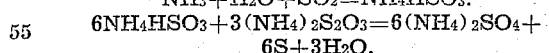
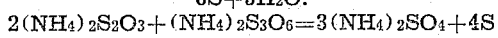

On the drawing there is shown in a side view and partly in longitudinal section a contrivance for carrying out the process according to this invention.

In the case of the apparatus shown sulphur dioxide is produced in a rotary tube oven 1, by burning with air substances containing sulphur for instance pyrites, supplied to the delivery device 2. The gases thus resulting containing sulphur dioxide and some sulphur trioxide are led forward by the pipe line 3 into a contrivance 4 in which any dust carried forward with the gases from the rotary tube oven are precipitated by electrostatic effect after the well-known manner. From the contrivance 4 the gases are led forward through the pipe line 5 into a tubular cooler 6 to which cooling water to the pipe branch 7 is passed and from which the cooling water is drawn off by the pipe branch 8. From the cooler 6 the gases go forward through the pipe line 9 into a washing tower 11 which is packed with an acid resisting material for the purpose of increasing the surface of a fluid, for instance so called Raschig rings 10, in which the gas is handled with diluted sulphuric acid which is supplied to the tower by the distributing device 12. The sulphuric acid passes off at the foot of the cooler into a storage tank 13 and is carried back in circulation by means of the pump 14 through the pipe line 15 again to the distributing device 12.

From the washer 11, the gases pass through the pipe line 16 into a second tubular cooler 17 to which cooling water is conducted in a similar manner so that in case of the cooler 6 by the branches 18 and from which the cooling water is led off by the pipe branches 18a.

From the tubular cooler 17 a gas pipe line 19 is connected up with a washing tower 21, fitted up with wooden hurdles 20, the function of said tower will later be touched upon. The upper end of the washing tower 21 is connected up by the pipe line 22 to the lower end of the washer 23 which is likewise fitted up with wooden hurdles from which the gases not taken up can escape by the waste air vent 24.

The ammoniacal liquor used in the process is kept in a storage tank 25 from which it is carried forward through the pipe line 26 into a lower tank 27. From the latter the ammoniacal liquor is carried forward by means of the pump 28 through the pipe line 29 to the upper end of the washing tower 23 which is fitted with a similar liquid distribution device as shown in the case of the washing tower 21. The ammoniacal liquor streams over the hurdles of the washer 23 downwards and so takes up practically the entire sulphur dioxide from the gases passing through the tower 23. At the foot of the tower 23 the liquid then runs out, passes first of all through a tubular cooler 30 and flows from the same through the pipe line 31 again into the lower tank 27. The process is so carried on that the liquid is passed through the washer 23 until a solution is formed showing neither an ammoniacal nor a sulphurous acid tension so that neither ammonia nor sulphurous acid escape through the waste air pipe vent 24. In the later course of the process that composition of the liquid according to the degree of the sulphurous acid absorption is obtained in the washer 23 by the addition of ammoniacal liquor from the overhead tank 25.

In the course of the process the volume of the liquid kept in circulation through the washer 23 is increased; therefore the increase in respect of the liquid is carried forward continuously or intermittently to the pipe line 33 provided with a regulating valve 32 in a second lower tank 34, from which the solution consisting of ammonium sulphite and ammonium bisulphite is carried forward by means of a pump 35 through the pipe line 36 into the liquid distributing device 37 at the upper end of the tower 21. The liquid sprays over the hurdles 20 of the washer 21 where it removes from the gas the greater part of the sulphur dioxide and froms ammonium bisulphite.

At the foot of the washer 21 the solution heated up owing to the absorption of sulphur dioxide is carried forward to a tubular cooler 38 and is passed from same to the lower tank 34. The liquid circulating in the washer 21 remains so long in circulation until same contains ammonium sulphite and ammonium bisulphite in the proportion of 1 molecule to 2 molecules. By the addition of the ammoniacal liquor from the overhead tank 25 through the pipe line 40 provided with a valve 39 the composition of the fluid can be regulated.

A portion of the fluid circulating in the washer 21 goes through the pipe line 41 to a storage tank 42 from which it is carried forward through the pipe line 44 provided with a valve 43 into a vessel 45. The walls of the heating vessel contain coils 46 through which any means of heating, preferably steam can be conducted. Moreover, the vessel 45 is fitted up with an agitator 65. On the top 47 of the vessel there is a closable delivery hopper 48 provided for the sulphur to be supplied to the vessel 45. Further, on the top 47 of the vessel 45 there is the outlet of pipe line 49 as well as of the pipe line 50. The pipe line 49 is connected up with the lower tank 13 of the washing tower 11 and serves to carry forward the sulphuric acid washed out in the tower 11 during the course of the process into the tank 45. When adding sulphuric acid to the heatable agitating vessel 45 it is advisable to add further a small quantity of ammonia for the purpose of neutralizing the acid added.

The pipe line 50 leads from the vessel 45 to the gas pipe line 19 and serves to return the sulphur dioxide formed in the agitating vessel 45 into the washer 21 and 23 for the purpose of working up the sulphur dioxide.

In the agitating vessel 45 the solution of ammonium sulphite and ammonium bisulphite coming from the vessel 42 is heated up with elementary sulphur resulting in a solution which contains ammonium thiosulphate and ammonium polythionate in the proportion of 2 molecules to 1 molecule. After the completion of the reaction the liquid is conducted through the pipe line 51 in a vessel 53 fitted with heating coils 52 in which the liquid is heated up under pressure to such a temperature that the ammonium thionate is converted into ammonium sulphate and sulphur. The sulphur collects in the autoclaves 53 in the lower portion and is drawn off through the pipe lines 54 into the sulphur solidifying boxes 55.

The fluid which collects above the molten sulphur and only contains sulphate of ammonia is carried off through the pipe lines 56 into a storage tank 57 from which it is carried forward through the pipe line 58 to the evaporators 59 in which the solution is evaporated up until the solid ammonium sulphate is separated out, which is freed in a centrifugal 60 from any mother liquor still adhering, which is returned through the pipe line 61 by means of the pump 62 into the storage tank 67.

The sulphur let off into the sulphur solidifying boxes 55 from the autoclaves 53 is partly ground and used for the conversion of the ammonium sulphite-bisulphite solution in the heatable vessel 45. The remainder is crushed and burned to sulphur dioxide and sulphur trioxide in a sulphur burner 64 which is connected up by the pipe line 63 to the gas pipe line 5 from the roasting furnace.

In carrying out the process according to this invention the procedure, when making use of the apparatus shown on the drawing, is approximately as follows:

Supposing it is intended to produce 100 tons of solid ammonium sulphate, there must be roasted in oven 1—60.5 tons of pyrites containing 24.2 tons of sulphur. In the sulphur burner 64, there are to be burned 12.2 tons sulphur produced in the autoclaves 53. There results altogether 72.8 tons $SO_2$ providing that the formation of $SO_3$ is entirely prevented.

In the towers 21 and 23 the sulphur dioxide is brought into contact with 152 tons ammoniacal liquor (17% $NH_3$) whereby result 224.8 tons of a solution which contains 112.3 tons ammonium sulphite and ammonium bisulphite in the proportion of 1 molecule to 2 molecules. This solution is treated in the vessel 45 with 19 tons of ground sulphur; there results 70.5 tons of ammonium thiosulphate and 54.3 tons ammonium trithionate. The solution containing these two compounds is heated up in the autoclaves 53 under pressure to 160°. A solution of 100 tons of ammonium sulphate and 31.2 tons sulphur results from which after the evaporation of 112.5 tons of water can be obtained 100 tons of ammonium sulphate.

The invention as hereinabove set forth is embodied in a particular form of construction, but may be variously embodied within the scope of the claims hereinafter made.

I claim

1. Process for the production of ammonium sulphate from aqueous ammoniacal solution and gaseous sulphur dioxide or from gases containing sulphur dioxide comprising the following steps simultaneously in separate stages, combining ammonia with sulphur dioxide forming ammonium sulphite and ammonium bisulphite, treating a solution containing ammonium sulphite and ammonium bisulphite with sulphur at temperatures above 60° C. in such quantities that a solution containing ammonium thiosulphate and ammonium polythionate but no ammonium sulphate is formed, thereafter separately heating a solution of ammonium thiosulphate and polythionate to form ammonium sulphate and sulphur, separating the sulphur and recovering solid ammonium sulphate from the last stage, conveying ammonium sulphite and ammonium bisulphite from the first stage to the second, and thiosulphate and polythionate from the second stage to the third stage and simultaneously effecting the aforesaid reactions in the respective stages therewith.

2. Process for the production of ammonium sulphate from aqueous ammoniacal solution and gaseous sulphur dioxide or from gases containing sulphur dioxide comprising the following steps simultaneously in separate stages, combining ammonia with sulphur dioxide forming ammonium sulphite and ammonium bisulphite producing a solution containing ammonium sulphite and ammonium bisulphite in the ratio 1 molecule ammonium sulphite to 2 molecules ammonium bisulphite, treating a solution containing ammonium sulphite and ammonium bisulphite with sulphur in such quantities that a solution containing ammonium thiosulphate and ammonium polythionate but no ammonium sulphate is formed, thereafter separately heating a solution of ammonium thiosulphate and polythionate to form ammonium sulphate and sulphur, separating the sulphur and recovering solid ammonium sulphate from the last stage, conveying ammonium sulphite and ammonium bisulphite from the first stage to the second, and thiosulphate and polythionate from the second stage to the third stage and simultaneously effecting the aforesaid reactions in the respective stages therewith.

3. Process for the production of ammonium sulphate from aqueous ammoniacal solution and gaseous sulphur dioxide or from gases containing sulphur dioxide comprising the following steps simultaneously in separate stages, combining ammonia with sulphur dioxide forming ammonium sulphite and ammonium bisulphite, treating a solution containing ammonium sulphite and ammonium bisulphite with sulphur in such quantities that a solution containing ammonium thiosulphate and ammonium polythionate but no ammonium sulphate is formed, thereafter separately heating a solution of ammonium thiosulphate and polythionate to form ammonium sulphate and sulphur, separating the sulphur and recovering solid ammonium sulphate from the last stage, conveying ammonium sulphite and ammonium bisulphite from the first stage to the second, and thiosulphate and polythionate from the second stage to the third stage and simultaneously effecting the aforesaid reactions in the respective stages therewith.

CHRISTIAN JOHANNES HANSEN.